United States Patent [19]

Hirayama et al.

[11] Patent Number: 4,547,705
[45] Date of Patent: Oct. 15, 1985

[54] DISCHARGE LAMP LIGHTENING DEVICE

[75] Inventors: Hiromitsu Hirayama; Hisashi Ebina, both of Tokyo, Japan

[73] Assignee: TDK Corporation, Tokyo, Japan

[21] Appl. No.: 461,518

[22] Filed: Jan. 27, 1983

[30] Foreign Application Priority Data

Aug. 28, 1982 [JP] Japan .................. 57-149590
Sep. 2, 1982 [JP] Japan .................. 57-40177
Nov. 1, 1982 [JP] Japan .................. 57-190871

[51] Int. Cl.$^4$ .................. H05B 37/02; H05B 39/04; H05B 41/36
[52] U.S. Cl. .................. 315/219; 315/254; 315/277; 315/278; 336/178; 336/212
[58] Field of Search .................. 336/178, 212; 315/254, 315/277, 278, DIG. 7, 219

[56] References Cited

U.S. PATENT DOCUMENTS

| | | | |
|---|---|---|---|
| 3,132,285 | 5/1964 | Ouletta .................. | 315/278 |
| 3,316,621 | 5/1967 | Schwarz et al. .................. | 336/212 X |
| 3,392,310 | 7/1968 | Feinberg .................. | 315/278 |
| 3,461,758 | 8/1969 | Michiulis .................. | 336/212 X |
| 3,576,508 | 4/1971 | Liberman .................. | 336/178 |
| 4,323,823 | 4/1982 | Boggavarapu .................. | 315/254 |
| 4,453,109 | 6/1984 | Stupp et al. .................. | 315/278 |

Primary Examiner—Saxfield Chatmon
Attorney, Agent, or Firm—Martin M. Novack

[57] ABSTRACT

Two fluorescent lamps are lightened by a single inverter circuit which provides switched power current to a single leakage transformer. The leakage transformer has a single primary winding coupled with said inverter circuit and a pair of secondary windings each coupled with a related fluorescent lamp. The core of said leakage transformer has a closed magnetic core with a pair of short legs each of which bridges across said closed magnetic path with a non-magnetic material so that said pair of short legs provides three windows and bypass leakage magnetic paths. The first window is defined by said pair of short legs, and each of the second and the third legs is defined by one of said short legs and said closed magnetic path. The primary winding is mounted in said first window, and each of said pair of secondary windings is mounted in said second or third window. The magnetic flux in said closed magnetic path provides high output voltage, which fires a lamp, then, the magnetic flux is switched to the leakage path which includes said short leg and the non-magnetic material, then, the output voltage is reduced but is enough to maintain the discharge current in the lamp.

10 Claims, 17 Drawing Figures

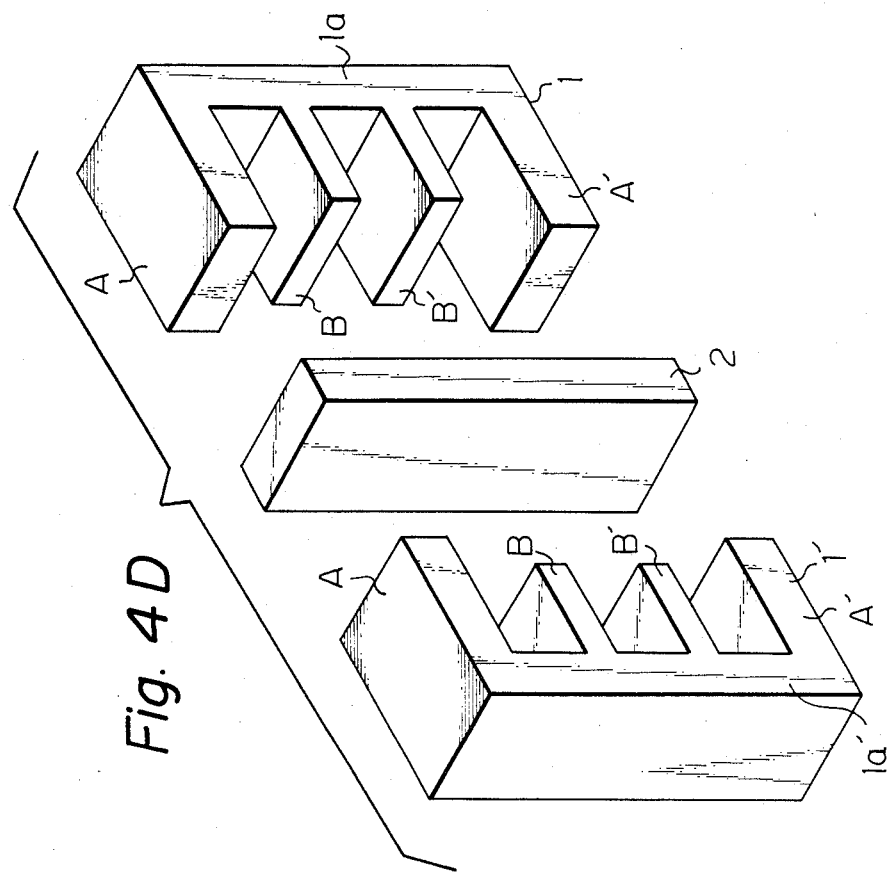

DISCHARGE LAMP LIGHTENING DEVICE

BACKGROUND OF THE INVENTION

The present invention relates to a discharge lamp lightening device, in particular, relates to a leakage transformer in that device. That leakage transformer doubles as a balast for restricting discharge current in a discharge lamp like a fluorescent lamp. The present invention relates, in particular, to such a leakage transformer which supplies to a pair of fluorescent lamps.

Conventionally, a balast for restricting current in a fluorescent lamp is a choke coil inserted between a power source and a lamp. A conventional choke coil balast has the disadvantages that it is heavy in weight, large in size, and also low in efficiency.

Another conventional balast for restricting current in a fluorescent lamp is an inverter balast implemented by electronic components. The present invention relates to such an inverter balast.

When a pair of fluorescent lamps are used, it is preferable that those two lamps are lighted by a single lightening device, which can also light a fluorescent lamp even when one of the fluorescent lamps is switched off or removed. Further, it is preferable that the inverter is not influenced even when one of the lamps is switched off or removed.

FIG. 1 shows a circuit diagram of a prior inverter type fluorescent lamp lightening device, in which the symbols T1 and T2 are output transformers of an inverter IV, F1 and F2 are fluorescent lamps, IV is an inverter circuit, and LB is called a balancer choke coil. The circuit of FIG. 1 has a pair of transformers T1 and T2, the secondary windings of which are coupled parallel with each other as shown in the figure. The output of the secondary winding is applied to the center tap of the choke coil LB, both ends of which are connected to each end of the fluorescent lamps F1 and F2. The other ends of the fluorescent lamps F1 and F2 are connected to the other end of the secondary winding.

It should be noted that the firing voltage of a fluorescent lamp depends upon each lamp, and therefore, two lamps F1 and F2 do not fire at the same time in a strict sense. Even when one of the lamps fires first, the other lamp can fire because of the presence of the center-tapped choke coil LB. It should be noted that if no center tapped choke coil LB were provided, the second lamp could not fire, since the discharge voltage across the fired lamp is considerably lower than the firing voltage. Due to the presence of the choke coil LB, the circuit of FIG. 1 has the advantages that it can fire two lamps even when the firing voltage of the first lamp is different from that of the second lamp, it can fire a lamp even when there is a trouble with another lamp, or even when another lamp is removed.

However, the circuit of FIG. 1 has the disadvantage that it needs two transformers T1 and T2 and the particular choke coil, which are heavy in weight, and increase the price of the device. Further, the choke coil works only when a lamp starts to fire, but it plays no role after a lamp is fired.

FIG. 2 shows another prior circuit, in which a single transformer T is used, and a pair of fluorescent lamps F1 and F2 are connected in series as shown in the figure. Further, the capacitor C is connected parallel to one (F1) of the lamps. Due to the presence of the capacitor C which has the capacitance of about 1000 pF and has considerably small impedance as compared with that of a lamp, the secondary voltage across the secondary winding of the transformer T is mainly applied to the lamp F2 which does not have a capacitor C, then, that lamp F2 is fired first. When the lamp F2 is fired, the discharge voltage across the lamp F2 is considerably lower than the firing voltage, and therefore, almost all the voltage across the secondary winding of the transformer T is applied to the first lamp F1, then, the lamp F1 is fired. The circuit of FIG. 2 has the advantages that only a single secondary winding is enough for supplying to two lamps, and no choke coil is necessary.

However, the circuit of FIG. 2 has the disadvantage that when one of the lamps, in particular the lamp F2, is removed or there is something wrong with the lamp F2, the other lamp F1 can not be fired, since the series circuit is broken.

In order to solve the above disadvantage, the present applicant proposed the Japanese utility model application No. 100588/82. FIG. 3 is the circuit diagram of that proposal, in which a pair of transformers T1 and T2 are provided to lighten a pair of lamps F1 and F2, and each transformer lightens a single lamp (F1 or F2). The circuit of FIG. 3 has the advantages that no choke coil nor capacitor is necessary, and even when one of the lamps is removed, the rest of the lamp can operate.

However, the circuit of FIG. 3 has the disadvantage that two transformers T1 and T2 are necessary.

SUMMARY OF THE INVENTION

It is an object, therefore, of the present invention to provide an improved discharge lamp lightening device by overcoming the disadvantages of prior discharge lamp lightening devices.

It is also an object of the present invention to provide a discharge lamp lightening device in which no choke coil nor starting capacitor is necessary, a single transformer can supply to two lamps, and even when one of the lamps is removed, the other lamp can still operate.

The above and other objects are attained by a discharge lamp lightening device for operating two discharge lamps having an inverter circuit for switching power supply current, a leakage transformer which is supplied primary current by said inverter circuit to provide output voltage to the discharge lamps, wherein said leakage transformer has a magnetic core; a primary winding wound around said core and coupled with said inverter circuit; a pair of secondary windings each coupled with a related discharge lamp; said magnetic core having a first magnetic path interlinking with said primary winding and both of said seconary windings, a second and a third magnetic paths interlinking with the primary winding and one of the secondary windings, said second and third magnetic paths having the common portion with the first magnetic path and a non-magnetic gap in each of the second and the third magnetic paths, and a fourth magnetic path which interlinks with the primary winding, said fourth path having the common portion with the first magnetic path and non-magnetic gap.

BRIEF DESCRIPTION OF THE DRAWINGS

The foregoing and other objects, features, and attendant advantages of the present invention will be appreciated as the same become better understood by means of the following description and accompanying drawings wherein:

FIG. 4D is the perspective view of the transformer of FIG. 4A.

DESCRIPTION OF THE PREFERRED EMBODIMENTS

Figure 1:
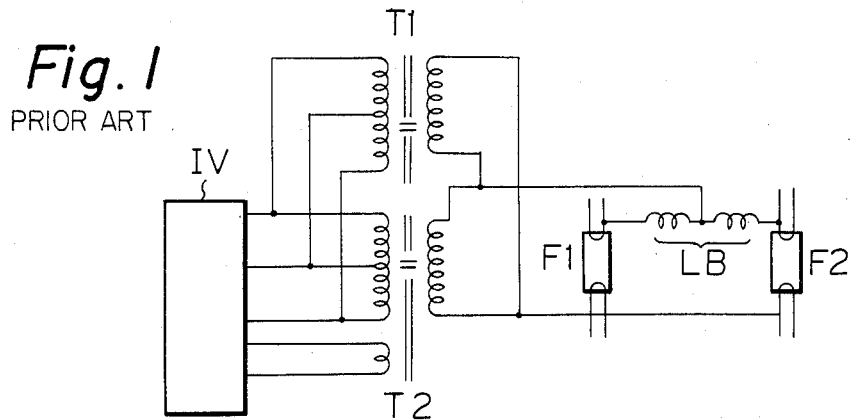
FIG. 1 is a circuit diagram of a prior fluorescent lamp lightening device.
Figure 2:
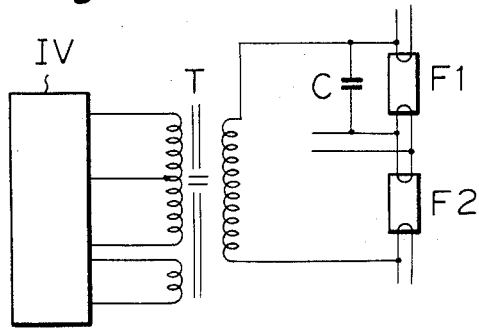
FIG. 2 is a circuit diagram of another prior fluorescent lamp lightening device.
Figure 3:
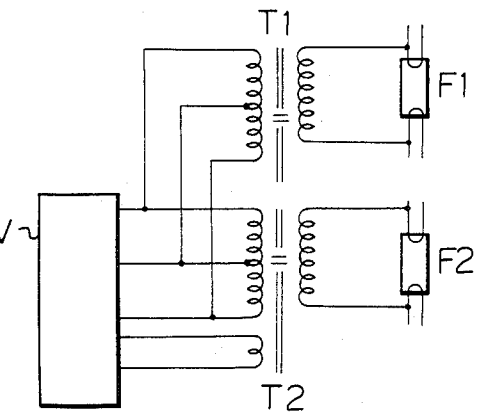
FIG. 3 is a circuit diagram of still another prior fluorescent lamp lightening device.
Figure 4A:
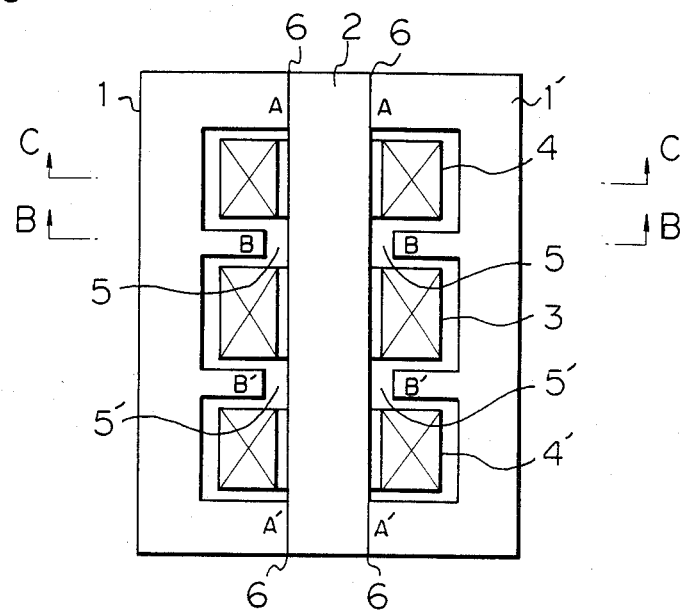
FIG. 4A is a cross section of the leakage transformer for the use of the fluorescent lamp lightening device according to the present invention.
Figure 4C:
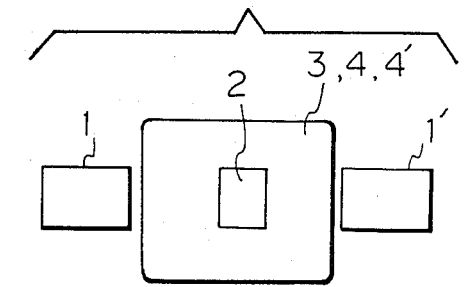
FIG. 4C is the cross section at the line C—C of FIG. 4A.
Figure 4B:
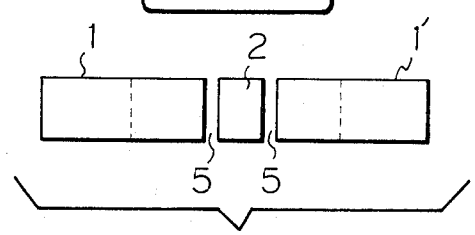
FIG. 4B is the cross section at the line B—B of FIG. 4A.
Figure 5:
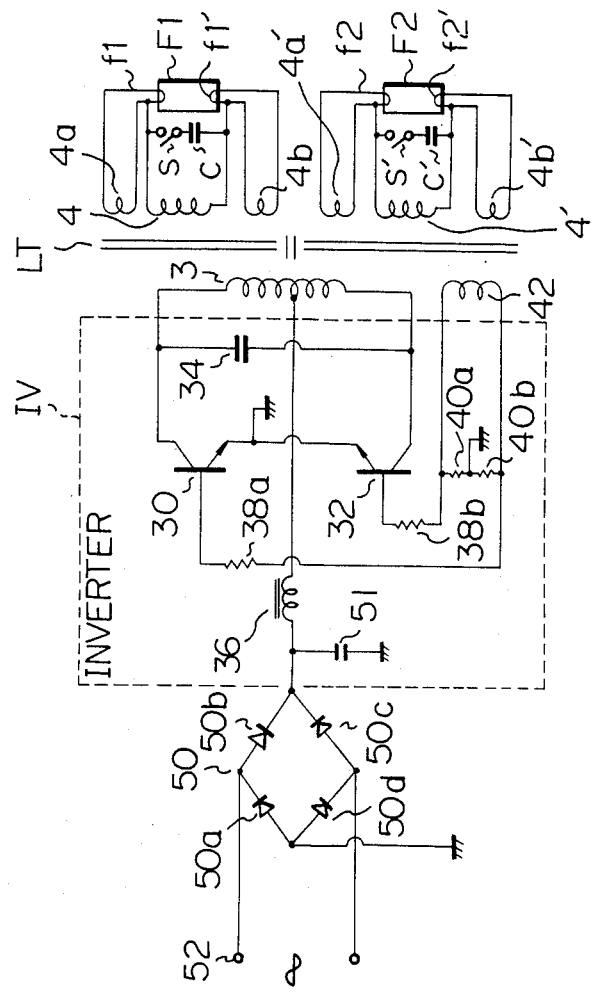
FIG. 5 is a circuit diagram of the fluorescent lamp lightening device according to the present invention.

FIG. 4A is a cross section of the leakage transformer of the present discharge lamp lightening device, FIG. 4B is the cross section at the line B—B of FIG. 4A, FIG. 4C is the cross section at the line C—C of FIG. 4A, FIG. 4D is the perspective view of the core of the transformer of FIG. 4A, and FIG. 5 is the circuit diagram of the discharge lamp lightening device according to the present invention. The following embodiments are applied to lighten two fluorescent lamps.

In FIG. 5, the symbol IV shows an inverter circuit for applying the switched current to the leakage transformer LT. The rectifier 50 which has four diodes 50a, 50b, 50c and 50d in the bridge arrangement supplies the DC power to the inverter IV from the commercial alternating power line 52. The leakage transformer LT has a magnetic core, a primary winding 3, a pair of secondary windings 4 and 4', two pairs of filament windings 4a and 4b, and 4a' and 4b', and the feedback winding 42 winding. The first pair of filament windings 4a and 4b and the first secondary winding 4 supply to the first lamp F1, and the second pair of filament windings 4a' and 4b' and the second secondary winding 4' supply to the second lamp F2. The filament windings are coupled with the filaments (f1, f2, f1' and f2'), and the output of the secondary winding (4, 4') is connected between the filaments (f1 and f1', f2 and f2'), as shown in FIG. 5.

Capacitor 51 is the input or reservior capacitor, and the capacitance depends on the design conditions.

The inverter circuit IV has a pair of transistors 30 and 32, the collectors of which are connected across the primary winding 3 of the leakage transformer LT, the capacitor 34 which is connected across the primary winding 3, the resistors 38a and 38b inserted in the base circuits of the transistors 30 and 32, and a choke coil 36 which is inserted between the output of the rectifier 50 and the center tap of the primary winding 3 of the leakage transformer LT. The resistors 40a and 40b are provided across the feedback winding 42, and the joint point of those resistors 40a and 40b is grounded.

The inverter circuit IV oscillates, in other words, the transistors 30 and 32 are turned ON and OFF alternately and the primary current in the primary winding 3 flows in a positive or negative direction depending upon which transistor 30 or 32 is conductive. The oscillation frequency of the inverter circuit IV is determined by the magnetic saturation of the core of the leakage transformer LT—when the core is magnetically saturated, the transistor 30 is turned to OFF and the other transistor 32 is turned to ON, and when the core is saturated in the opposite direction the transistor 30 is turned to OFF and the other transistor 32 is turned to ON. The capacitance of the capacitor 34 is designed so that the leakage inductance of the transformer LT and that capacitance resonate with the oscillation frequency of the inverter circuit IV. Preferably, the oscillation frequency of the inverter circuit is 20–50 kHz, or is higher than 50 kHz, and the magnetic core of the leakage transformer LT is made of material having a small amount of loss at that frequency, like ferrite material.

The choke coil 36 has large impedance for the oscillation frequency or the switching frequency of the inverter circuit IV so that the choke coil 36 may restrict the input current of the inverter circuit.

The leakage transformer LT which is used in FIG. 5 is shown in FIGS. 4A through 4D. The leakage transformer LT has the I-shaped center core 2, a pair of side cores 1 and 1' each of which has four legs A, A', B and B', a primary winding 3, and a pair of secondary windings 4 and 4'. The length of the outer legs A and A' is longer than the length of the inner legs B and B', and therefore, when the core is assembled so that the end of the legs A and A' abut on the center core 2, narrow gap spaces 5 and 5' are provided between the center core 2 and the ends of the inner legs B and B'. Those gap spaces 5 and 5' which have non-magnetic property provide the leakage performance of the leakage transformer.

As apparent from FIGS. 4A through 4D, the core has the first window between the inner legs B and B', the second window between the outer leg A and the inner leg B, and the third window between the inner leg B' and the outer leg A'. The primary winding 3 is provided in the first window between the inner legs B and B', and the first secondary winding 4 is provided in the second window between the outer leg A and the inner leg B, and the second secondary winding 4' is provided in the third window between the inner leg B' and the outer leg A'. The feedback winding 42 for operating the inverter circuit, and the filament windings 4a, 4b, 4a' and 4b' may be provided in any window. The feedback winding is required in the case that the inverter employs the self-oscillating circuit, but it can be omitted if the inverter is an external oscillating circuit. Preferably, the feedback winding is provided in the first window where the primary winding is provided, and the filament windings are provided in the window where the related secondary winding is provided.

The presence of three windows, respectively having the primary winding 3, and the secondary windings 4 or 4' is an important feature of the present invention.

The gap spaces 5 and 5' between the center core 2 and the side cores 1 and 1' provide the desired magnetic reluctance of the leakage transformer LT, that is to say, that magnetic reluctance restricts the discharge current in a lamp after that lamp is fired. Preferably, a thin non-magnetic gap sheet, if it is required because of the inductance value, is inserted between the center core 2 and the end of the longer legs A and A' so that the desired inductance of the primary winding 3 and the secondary windings 4 and 4' is obtained.

Figure 6A:
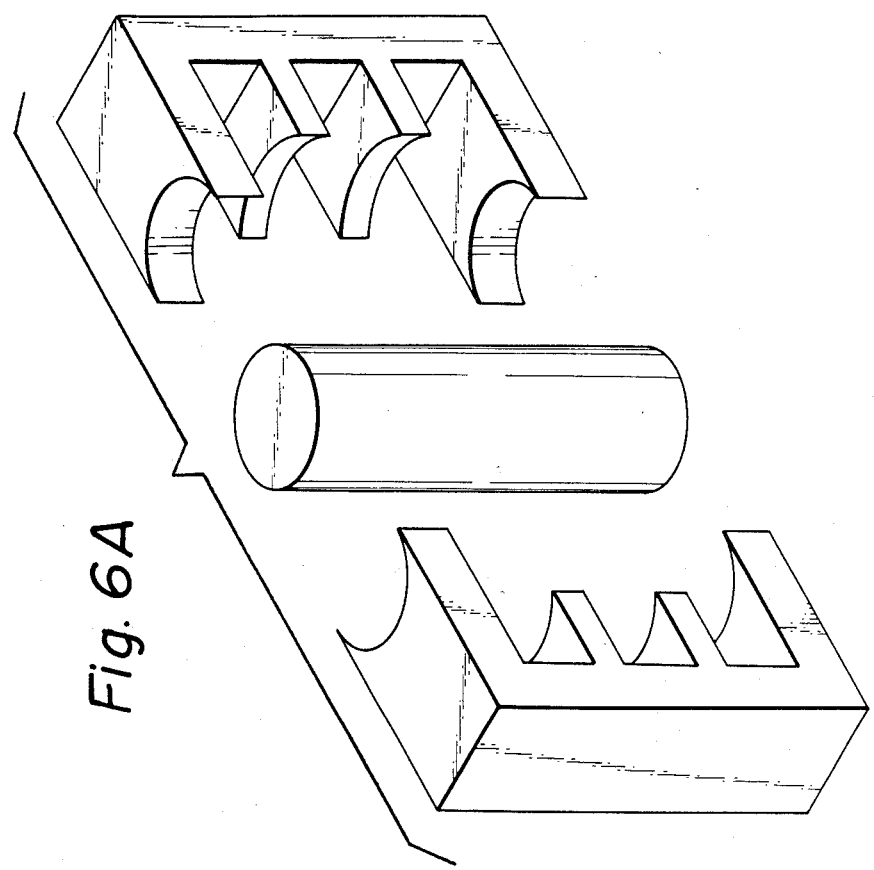
FIG. 6A is the perspective view of the modification of the core of the leakage transformer according to the present invention.
Figure 6B:
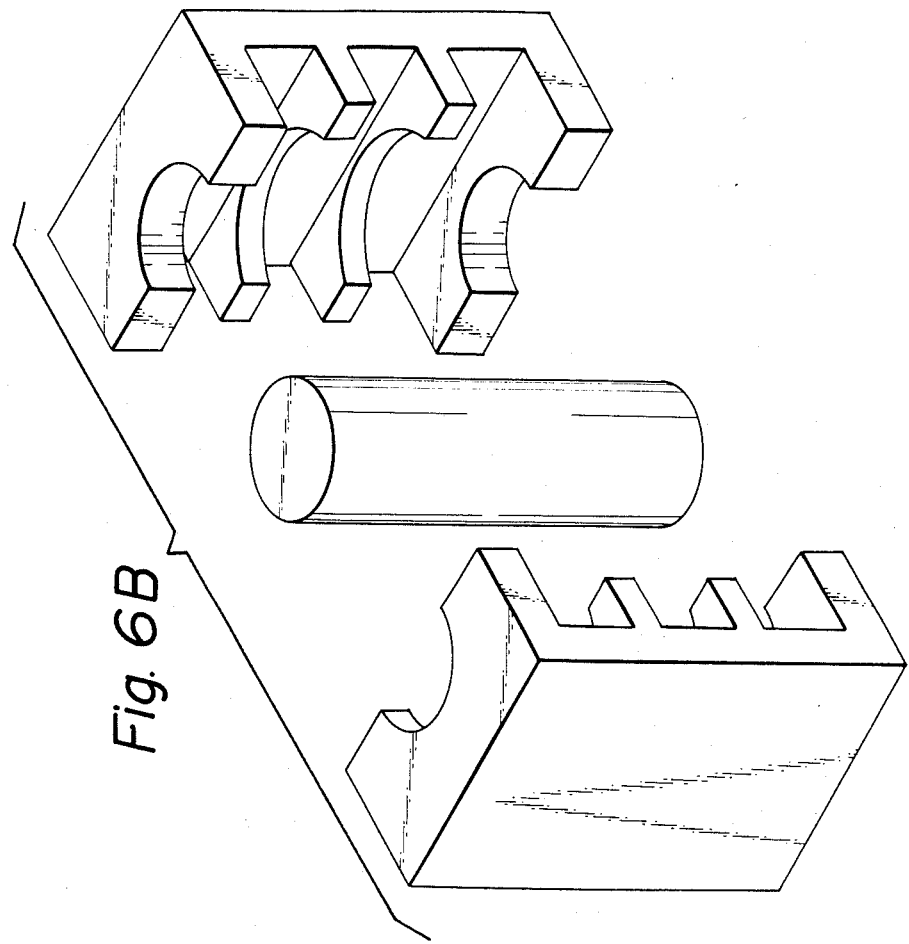
FIG. 6B is another modification of the core of the leakage transformer according to the present invention.
Figure 6C:
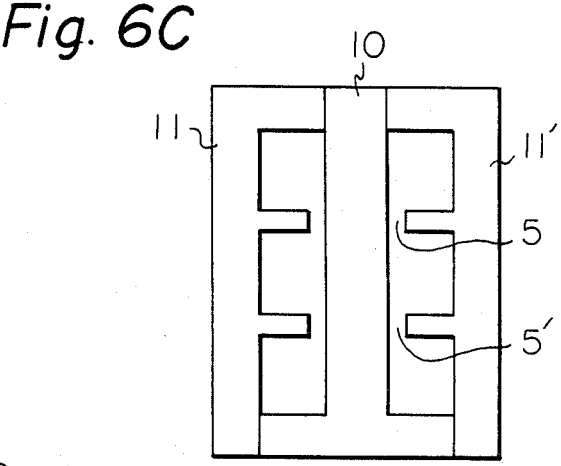
FIG. 6C is still another modification of the core of the leakage transformer according to the present invention.
Figure 6D:
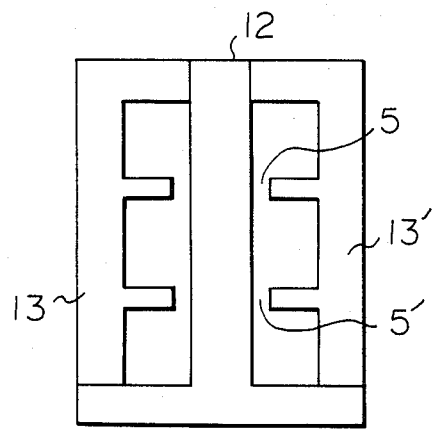
FIG. 6D is still another modification of the core of the leakage transformer according to the present invention.
Figure 6E:
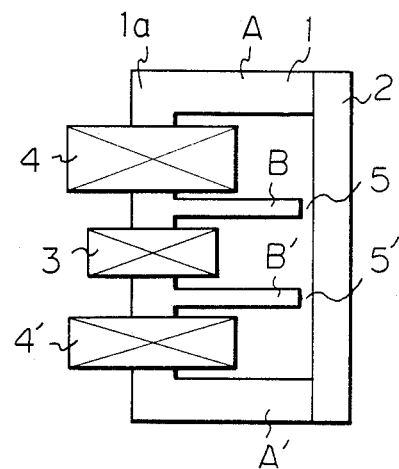
FIG. 6E is still another modification of the core of the leakage transformer according to the present invention.

FIGS. 6A through 6E show modifications of the structure of the core of the leakage transformer LT. The core of FIG. 6A has a circular center core instead of a rectangular center core 2 of FIG. 4D. The core of FIG. 6B has also a circular center core, and the side cores of FIG. 6B abut to each other, although the side cores of FIG. 4D couple merely with a center core but do not couple with each other. The structure of FIG. 6B has an excellent shielding effect since the windings are completely surrounded by the core. The structure of FIG. 6C has the T-shaped center core 10 instead of the I-shaped center core 2 of FIG. 4D, and the bottom leg of that T-shaped core 10 replaces the related legs A and A' of the side cores of FIG. 4D. The structure of FIG. 6D is a modification of that of FIG. 6C, and the T-shaped center core 12 of FIG. 6D is slightly longer than that of FIG. 6C. The structure of FIG. 6E is a simple structure having a single side core 1a.

The structure of the core is selected from FIG. 4D, and FIGS. 6A through 6E according to the manufacturing requirements.

The operation of the present leakage transformer LT is described in accordance with FIGS. 7A through 7D.

In the present leakage transformer LT, the main operative magnetic path in the core of the transformer is one of the paths a, b, b' and c as shown in FIGS. 7A through 7D.

(a) When two lamps are dark (FIG. 7A):

When two lamps F1 and F2 are dark, no secondary current flows in the secondary windings 4 and 4', and therefore, the magnetic reluctance around the secondary windings 4 and 4' is low as compared with the magnetic reluctance of the gap spaces 5 and 5'. Therefore, the magnetic flux circulates in the path (a) (see FIG. 7A) from the center core 2, through the outer leg A, the side wall 1a, the other outer leg A' to the center core 2, and said path (a) interlinks with the primary winding 3 and both the secondary windings 4 and 4'. Accordingly, a high voltage is induced on the secondary windings 4 and 4' to fire the lamps F1 and F2.

It should be appreciated that two lamps are never fired simultaneously, due to the difference of the characteristics of the two lamps.

(b) When only one lamp is bright (FIG. 7B, FIG. 7C):

When the lamp F2 which is coupled with the secondary winding 4' is fired first, the secondary current flows in the secondary winding 4', then, the magnetic reluctance around the winding 4' becomes high as compared with the magnetic reluctance in the gap space 5'. Therefore, the magnetic path in this case goes from the center core 2, through the outer leg A, the side wall 1a, the inner leg B', the gap space 5' to the center core 2. Thus, the magnetic flux interlinks strongly with the primary winding 3 and the secondary winding 4, but a very small ratio of the magnetic flux rounds around the winding 4' as shown by the dotted line (x) in FIG. 7B. Accordingly, high voltage is still induced on the secondary winding 4 in order to fire the lamp F1, but the voltage on the winding 4' becomes low. It should be noted that the lowered voltage on the winding 4' is still enough for maintaining the discharge in the lamp F2, since the maintaining voltage of a discahge lamp is considerably lower than a firing voltage.

Figure 7A:
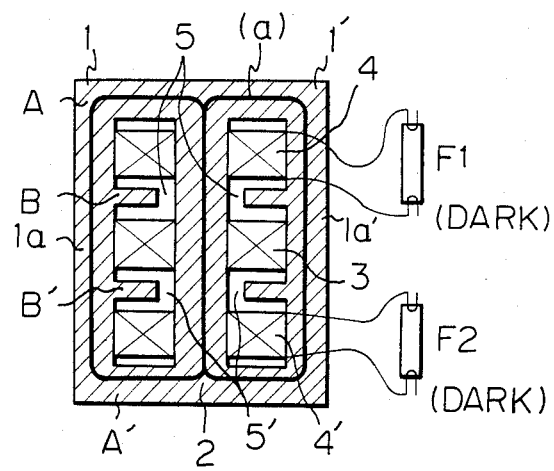
FIGS. 7A through 7D show the cross section of the leakage transformer of the present invention, for the explanation of the operation of the present invention.
Figure 7B:
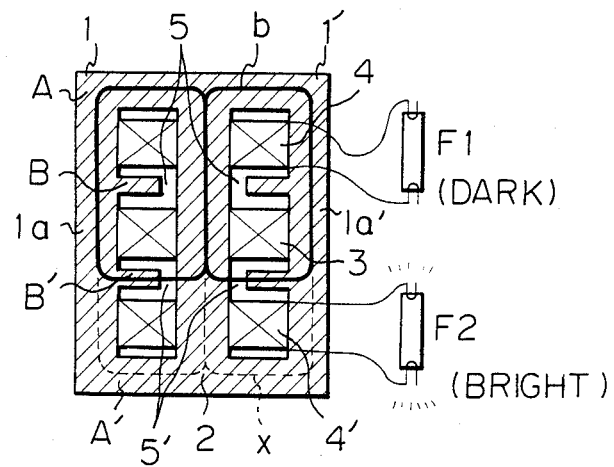
Figure 7C:
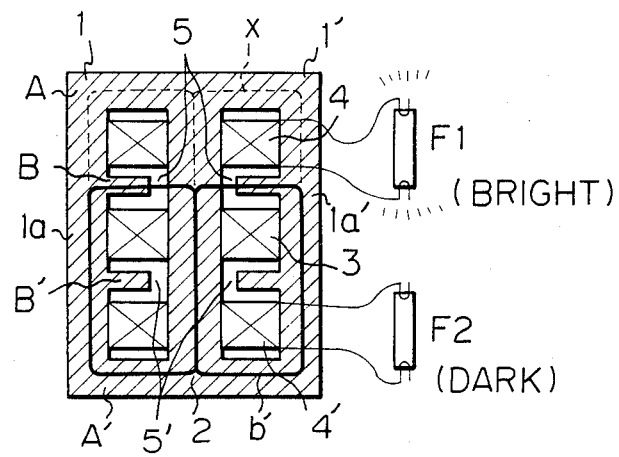
Figure 7D:
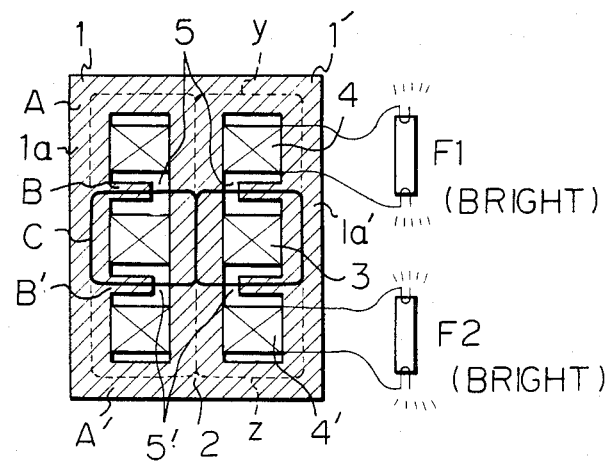

Contrary to the prior art, when another lamp F1 is bright first, and the lamp F2 is dark, the main magnetic path is b' of FIG. 7C, and a small portion of the magnetic flux circulates along the path (x). Therefore, a high voltage is applied to the lamp F2 which is still dark, and the voltage of the lamp F1 is lowered.

(c) When both lamps are bright (FIG. 7D):

When both lamps F1 and F2 are bright, the current flows in both the windings 4 and 4', then, the magnetic reluctance around the windings 4 and 4' is high. Therefore, the main magnetic path is the path (c) of FIG. 7D, and that path (c) goes from the center core 2, through the gap space 5, the inner leg B, the side wall 1a, another inner leg B', the gap space 5', to the center core 2. And, a small portion of the magnetic flux goes along the paths y and z, which link with the secondary windings 4 and 4'. Therefore, the secondary voltage induced on the windings 4 and 4' is low, but is enough for maintaining the discharge of the lamps.

It should be appreciated that when one of the lamps is turned OFF, after two lamps are fired, the operation returns to FIG. 7B or FIG. 7C. Then, that lamp may be turned ON again. Further, when one of the lamps is removed, the other lamp may still be bright, and when the lamp is mounted again, the lamp may be fired again without trouble.

The discharge current in the lamps when the lamps are bright is adjusted by the gap length of the gap spaces 5 and 5'.

It should be appreciated that the present leakage transformer may supply to two lamps although the power consumption in the first lamp F1 differs from the power of the second lamp F2 (for instance, the power of F1 is 40 watts, and the power of F2 is 20 watts). In that case, all that is necessary to do is to adjust the length and/or the area of the gap spaces 5 and 5' to adjust the magnetic field which interlinks with the secondary windings 4 and/or 4'.

It is preferably that a capacitor C or C' is connected across the secondary winding 4 or 4'when one of the lamps is removed so that a removal of a lamp does not affect to the operation of another lamp. In our experiment, we found that the oscillation frequency of the inverter decreases by 20% when one of the lamps is removed as compared with the frequency when both the lamps are mounted, and the power consumption in the lamp which is mounted increases by 10% when one of the lamps is removed. Of course, the change of the oscillation frequency and the change of the power consumption depending upon whether both lamps are mounted or not, is not desirable. The capacitors C and C' coupled across the secondary windings 4 and 4' solve the above problem.

The first capacitor C is connected across the secondary winding 4 through the switch S, and another capacitor C' is connected across another secondary winding 4' through another switch S'. When the first lamp F1 is removed, the switch S is closed so that the capacitor C is coupled with the circuit, and when that lamp F1 is mounted, the switch S is opened. Therefore, the capacitor functions as a dummy load of the lamp F1. Similarly, the switch S' is closed when the second lamp F2 is removed.

The capacitance of the capacitors C and C' is designed so that the impedance by the capacitor C or C' is almost equal to the impedance of a lamp F1 or F2 when the lamp is fired. Preferably, the capacitance of those capacitors C and C' is in the range from 0.05 $\mu$F to 5 $\mu$F when the oscillation freqency is 20–50 kHz, and a lamp of 40–110 watts is used.

Due to the presence of those capacitors C and C' which function as a dummy load of the lamps F1 and F2, respectively, the flow of the magnetic flux in the core is not affected by the presence or the non-presence of a lamp. Further, it should be noted that a capacitor is reactive and consumes no power, and no additional power is consumed by the presence of the capacitors C and C'. Thus, the oscillation frequency of the inverter and the power consumption in a lamp are constant irrespective of the removing of a lamp.

Further, it should be noted that if a switch S or S' is closed with a lamp mounted, the lamp is put off because of the low impedance of the capacitor. Therefore, the switch S and S' may be used to switch on or off the lamps selectively. When the switch S is closed with the lamp F1 mounted, the lamp F1 is put off, and when that switch S is opened the lamp F1 is put on.

As described above in detail, according to the present invention, a single inverter circuit can supply to two discharge lamps, and even when one of the lamps is removed, another lamp may operate.

From the foregoing, it will now be apparent that a new and improved power source for a discharge lamp, in particular, a new and improved leakage transformer for that power source has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A discharge lamp lightening device for operating two discharge lamps such that at least one of said lamps can be lightened even when the other of the lamps is removed, comprising an inverter circuit for switching power supply current, and a leakage transformer which is supplied current by said inverter circuit and provides output voltage to the discharge lamps:

CHARACTERIZED IN THAT
said leakage transformer comprises;
a magnetic core,
a primary winding wound around said core and coupled with said inverter circuit,
a pair of secondary windings each coupled directly with a related discharge lamp,
filament windings coupled with filaments of related discharge lamps,
said magnetic core being a closed magnetic core with at least a pair of legs which bridge said closed magnetic core, each of said legs having a non-magnetic gap between the end of the leg and said closed magnetic core, a first window defined between said pair of legs, second and a third windows defined by one of said legs and a part of said closed magnetic core, said primary winding being located in the first window and being coupled with an inverter circuit, said first secondary winding being located in the second window and being coupled with a first one of said discharge lamps, said second secondary winding being located in the third window and being coupled with a second one of said discharge lamps;
said magnetic core having a first magnetic path which interlinks with said primary winding and both of said secondary windings; second and a third magnetic paths each of which interlinks with the primary winding and a respective one of the secondary windings, said second and third magnetic paths each having a non-magnetic gap and a common portion with the first magnetic path; and a fourth magnetic path which interlinks with the primary winding and has a common portion with the first magnetic path and a non-magnetic gap.

2. A discharge lamp lightening device according to claim 1, wherein a thin non-magnetic gap sheet is inserted in said first magnetic path for providing desired inductance for a primary winding and secondary windings.

3. A discharge lamp lightening device according to claim 1, wherein said magnetic core has an I-shaped center core, and at least one toothed side core having a side wall, first and fourth legs, and second and third legs which are shorter than said first and fourth legs, said first and fourth legs abutting to the center core leaving gaps between the center core and the second and the third legs.

4. A discharge lamp lightening device according to claim 3, wherein the cross section of said I-shaped center core is rectangular.

5. A discharge lamp lightening device according to claim 3, wherein the cross section of said I-shaped center core is circular.

6. A discharge lamp lightening device according to claim 3, wherein there are provided a pair of side cores.

7. A discharge lamp lightening device according to claim 3, wherein there is provided one side core.

8. A discharge lamp lightening device according to claim 1, wherein said magnetic core has a substantially T-shaped center core, and a pair of L-shaped side cores each having a side wall, a first leg, and second and third legs which are shorter than said first leg, said first leg abutting to the center core to provide a closed magnetic path through said T-shaped core, the side wall of said L-shaped core and the first leg of said L-shaped core, and a non-magnetic gap is provided between said second and third legs, and said center core.

9. A discharge lamp lightening device according to claim 1, further comprising a pair of capacitors respectively coupled across the secondary windings of said leakage transformer through respective switches, each switch being operative to close when the respective lap associated with its secondary winding is removed.

10. A discharge lamp lightening device according to claim 9, wherein the capacitance of each of said capacitors is in the range from 0.05 uF to 5 uF.

* * * * *